(12) United States Patent
Weaver (10) Patent No.: US 8,140,953 B1
(45) Date of Patent: Mar. 20, 2012

(54) FLEXIBLE MEDIA CATALOG FOR MULTI-FORMAT PROJECT EXPORT

(75) Inventor: Dale Matthew Weaver, Wheaton, IL (US)

(73) Assignee: Adobe Systems Incorporated, San Jose, CA (US)

( * ) Notice: Subject to any disclaimer, the term of this patent is extended or adjusted under 35 U.S.C. 154(b) by 968 days.

(21) Appl. No.: 11/924,954

(22) Filed: Oct. 26, 2007

(51) Int. Cl.
*G06F 17/00* (2006.01)

(52) U.S. Cl. ........................................ 715/202

(58) Field of Classification Search .................. 715/201, 715/202
See application file for complete search history.

(56) References Cited

U.S. PATENT DOCUMENTS

| | | | |
|---|---|---|---|
| 6,320,598 B2* | 11/2001 | Davis et al. | 345/648 |
| 7,139,757 B1* | 11/2006 | Apollonsky et al. | 1/1 |
| 7,152,224 B1* | 12/2006 | Kaler et al. | 717/121 |
| 7,454,444 B2* | 11/2008 | Kagle et al. | 1/1 |
| 7,552,418 B2* | 6/2009 | Saad et al. | 717/100 |
| 7,636,889 B2* | 12/2009 | Weber et al. | 715/723 |
| 7,778,823 B2* | 8/2010 | Carson | 704/200 |
| 7,783,624 B2* | 8/2010 | Martinez et al. | 707/709 |
| 7,783,669 B2* | 8/2010 | Qiu et al. | 707/793 |
| 7,788,696 B2* | 8/2010 | Burges et al. | 725/114 |
| 2002/0016818 A1* | 2/2002 | Kirani et al. | 709/203 |
| 2002/0133515 A1* | 9/2002 | Kagle et al. | 707/511 |
| 2003/0066070 A1* | 4/2003 | Houston | 725/9 |
| 2004/0015821 A1* | 1/2004 | Lu et al. | 717/103 |
| 2004/0193639 A1* | 9/2004 | Bergman et al. | 707/103 R |
| 2004/0205528 A1* | 10/2004 | Alexander | 715/505 |
| 2005/0028006 A1* | 2/2005 | Leser et al. | 713/200 |
| 2005/0114784 A1* | 5/2005 | Spring et al. | 715/762 |
| 2005/0216506 A1* | 9/2005 | Theilmann et al. | 707/103 Y |
| 2006/0129907 A1* | 6/2006 | Volk et al. | 715/500 |
| 2006/0178917 A1* | 8/2006 | Merriam et al. | 705/7 |
| 2006/0242153 A1* | 10/2006 | Newberry et al. | 707/10 |
| 2006/0242178 A1* | 10/2006 | Butterfield et al. | 707/100 |
| 2006/0287916 A1* | 12/2006 | Starr et al. | 705/14 |
| 2007/0016887 A1* | 1/2007 | Kaler et al. | 717/101 |
| 2007/0038647 A1* | 2/2007 | Thomas et al. | 707/100 |
| 2007/0079010 A1* | 4/2007 | Heredia et al. | 709/246 |
| 2007/0083380 A1* | 4/2007 | Martinez | 705/1 |
| 2007/0118540 A1* | 5/2007 | Guo | 707/100 |
| 2007/0185876 A1* | 8/2007 | Mendis et al. | 707/10 |
| 2007/0186160 A1* | 8/2007 | McArdle et al. | 715/700 |

(Continued)

OTHER PUBLICATIONS

Marrin et al., Steerable Media: Interactive Television via Video Synthesis, ACM 2001, pp. 8-15.*

(Continued)

*Primary Examiner* — Cong-Lac Huynh (74) *Attorney, Agent, or Firm* — Kilpatrick Townsend & Stockton LLP (57) ABSTRACT

Methods and apparatus provide for a media tagger that obtains a media project defined according to a native representation. The media project is made up of project objects and the native representation describes each project object's context within the media project. The media tagger receives an exportable media object, encoded according to an output format, which can include logical contributions from the project object(s). The media tagger tags the exportable media object and stores the exportable media object in a media catalogue. The media tagger acknowledges the selection of a desired output format to create a formatted media project based on the native representation of the media project. Upon validating that the exportable media object in the media catalogue can be used to build the formatted media project, the media tagger exports the exportable media object from the media catalogue.

19 Claims, 8 Drawing Sheets

U.S. PATENT DOCUMENTS

| | | | |
|---|---|---|---|
| 2007/0245400 A1* | 10/2007 | Paek et al. | 725/142 |
| 2007/0253020 A1* | 11/2007 | Hull et al. | 358/1.15 |
| 2008/0027931 A1* | 1/2008 | Lu et al. | 707/6 |
| 2008/0040126 A1* | 2/2008 | Estrada et al. | 705/1 |
| 2008/0052372 A1* | 2/2008 | Weber et al. | 709/217 |
| 2008/0172750 A1* | 7/2008 | Keithley et al. | 726/28 |
| 2008/0282138 A1* | 11/2008 | Barthelmess et al. | 715/201 |
| 2008/0285939 A1* | 11/2008 | Baum et al. | 386/52 |
| 2009/0070114 A1* | 3/2009 | Staszak | 704/260 |
| 2009/0089651 A1* | 4/2009 | Herberger et al. | 715/202 |
| 2009/0216815 A1* | 8/2009 | Braginsky et al. | 707/203 |
| 2009/0287990 A1* | 11/2009 | Lynton et al. | 715/209 |
| 2010/0057555 A1* | 3/2010 | Butterfield et al. | 705/14.41 |
| 2010/0145794 A1* | 6/2010 | Barger et al. | 705/14.45 |
| 2011/0112917 A1* | 5/2011 | Driessen | 705/16 |

OTHER PUBLICATIONS

Fiala et al., Engineering the Presentation Layer of Adaptable Web Information Systems, Google 2004, pp. 459-472.*

Candan et al., Collaborative Multimedia Systems: Synthesis of Media Objects, IEEE 1998, pp. 433-457.*

Patel et al. Metatdata Requirements for Digital Museum Environments, Google 2006, pp. 179-192.*

Buttler etal., Data Conversion, Extraction and Record Linkage Uisng XML and RDF Tools in Project SIMILE, Google 2004, pp. 1-18.*

Cesar et al., An Architecture for End-User TV Content Enrichment, Google 2006, pp. 1-14.*

* cited by examiner

610 COLLECT INFORMATION FOR A METADATA TAG, THE COLLECTED INFORMATION PERTAINING TO AT LEAST ONE EXPORT SETTING FOR THE OUTPUT FORMAT OF THE EXPORTABLE MEDIA OBJECT, WHICH INCLUDES VISUAL INFORMATION THAT DESCRIBES AT LEAST ONE OF A RESOLUTION, AND AN ASPECT RATIO, VIDEO INFORMATION THAT DESCRIBES A FRAME RATE, AUDIO INFORMATION THAT DESCRIBES A SAMPLE RATE, FORMAT INFORMATION THAT DESCRIBES A CODEC FORMAT TYPE.

620 TAGGING THE EXPORTABLE MEDIA OBJECT WITH THE METADATA TAG TO INDICATE THAT THE EXPORTABLE MEDIA OBJECT COMPLIES WITH THE EXPORT SETTING.

710 CREATE A CONTENT TAG THAT RELATES TO AN AGGREGATE STATE OF THE MEDIA PROJECT, THE AGGREGATE STATE ACCOUNTING FOR THE ONE OR MORE PROJECT OBJECTS INVOLVED IN CREATING THE EXPORTABLE MEDIA OBJECT SUCH THAT A MODIFICATION APPLIED TO THE INVOLVED PROJECT OBJECTS REQUIRES THE EXPORTABLE MEDIA OBJECT TO BE INVALIDATED, THE MODIFICATION AFFECTING:
I) A STATE OF AT LEAST ONE OF THE FORMATTING SETTING AND THE ENCODER SETTING RELATED TO THE EXPORTABLE MEDIA OBJECT;
II) A STATE OF EXTERNAL MEDIA REFERENCED BY AT LEAST ONE OF THE INVOLVED PROJECT OBJECTS.

720 TAG THE CONTENT TAG TO THE EXPORTABLE MEDIA OBJECT TO INDICATE THAT THE EXPORTABLE MEDIA OBJECT CORRESPONDS WITH THE AGGREGATE STATE OF THE INVOLVED PROJECT OBJECTS.

FLEXIBLE MEDIA CATALOG FOR MULTI-FORMAT PROJECT EXPORT

BACKGROUND

Conventional computer systems allow for the production and distribution of multimedia data, including video, audio and image data. Such production is increasing at a phenomenal rate due to the growing popularity of the Internet, the growing affordability of personal computers capable of efficiently processing multimedia data to provide a pleasing experience for users, as well as the fact that multimedia data is far superior to text-only data in conveying content-rich information.

People now access and use multimedia data in numerous ways. One way that people access multimedia data is over a network. For example, people using web browsers on personal computers now access multimedia data by surfing the World Wide Web via the Internet. Countless numbers of content providers link multimedia data to web pages accessible by people using web browsers. Today, persons using web browsers can access a web page from a web server operated by a content provider to view video clips, listen to audio clips, or view images made available by the content provider.

When a client requests a piece of media content such as digital video, audio, or some other sampled content from a server, the client typically provides the global address of the content in the form of a Uniform Resource Locator (URL). A server then accesses the content and sends or "streams" it to the client as a continuous data stream.

There are various file formats for streaming media content and composite media streams. Regardless of the streaming file format used, an individual data stream may contain a sequence of digital data sets or units. The units can represent an image, sound, or some other stimuli that is perceived by a human to be continuously varying. The client can render the units individually, or in sequence, to reproduce the original stimuli. For example, a video data stream includes a sequence of digitally specified graphics frames that are rendered in sequence to produce a moving picture.

SUMMARY

Conventional applications that make media available to be rendered in different formats suffer from a number of deficiencies. For example, when the conventional applications provide the media for a particular format, the media is not retained. When a user desires the same media in a different output format, the user is forced to wait for the identical media to be recreated each time the media is selected for export to a particular format. Further, current conventional software is complex and too costly to implement, test, and maintain because of the need to maintain and invalidate media for each export format. In other words, conventional applications lack a comprehensive solution to determine when media complies with the requirements of multiple formats without incurring processing, storage and rendering costs.

In addition, some conventional systems maintain the media in parallel structures for each format. This approach requires the user interface and other operations that modify the media to execute processes upon all of the parallel structures in order to update the media in each format. Specifically, such an approach requires every internal operation, that may imply changes to the media, to invalidate the media for each parallel structure. Different logic could further be required in each case in order to update the media for each format. This is a great burden in terms of software complexity.

Embodiments disclosed herein can significantly overcome such deficiencies and/or other deficiencies in the prior art. The embodiments herein provide for a media tagger that applies tags to media objects (i.e. exportable media objects) in a media catalogue to allow for the tagged media objects to be interpreted as suitable representations of a project object(s) that is part of a media project, which is defined by a native representation. A native representation of the media project is provided that is independent of any particular output format and is a description of the structure of the media project that is internal to the media tagger.

The media project can be a viewer-controlled browsing experience that is comprised of various project objects such as the menus, menu options, a timeline(s), video, audio, images, highlights, media assets, format settings, and actions that can be viewed via, for example, a Digital Video Disc (hereinafter D.V.D. or DVD) format. The various project objects can be represented by media objects stored in a media catalogue and validated by the media tagger. Thus, to build the media project in accordance with the definition in the native representation, a "formatted" media project (i.e. the media project encoded in a desired output format) can be composed of validated media objects that were exported from the media catalogue.

The media tagger provides the media catalogue to tag and store exportable media objects in order to determine whether the exportable media object is available for inclusion in the media project in a desired output format. Whether an exportable media object in the media catalogue can be considered as available (or validated) relies on tags associated with the particular exportable media object. The tags provide information regarding that exportable media object's version, identification number, state, format settings and, hence, the exportable media object's suitability for being interpreted as embodying the role and context of the project object in the media project.

By querying against the information provided in the tags, the media tagger can validate whether the exportable media object complies with the requirements of the desired output format (e.g. D.V.D., Blu-Ray, Flash). If there is compliance, the exportable media object is exported from the media catalogue to ultimately be used in building the "formatted" media project. Often, the exportable media object can comply with multiple output formats so the media tagger does not require a distinct rendering of the project object(s) for every possible output format. Moreover, a validated exportable media object need not be an exact rendering of a project object(s). Rather, the exportable media object can contain data and content that is merely sufficient for taking on the role (and dependencies as to other project objects) of a project object(s), as defined in the native representation.

If it is determined that the exportable media object cannot be used to build the media project in the desired output format, the media tagger invalidates that exportable media object so that it is not exported. However, the invalidated, exportable media object is still maintained in the media catalogue for possible use in building the media project according to different output formats. In addition, as a project object that is part of the media project's native representation is modified, the exportable media object is still stored in the media catalogue as an embodiment of a prior version of the project object(s). Thus, if the user creating the media project decides to undo changes to the project object(s), then maintaining the exportable media object allows the media catalogue to already have an exportable media object for that prior version which could be used—if the exportable media object is found to be validated for the desired output format.

According to general embodiments, the media tagger obtains a media project defined according to a native representation. The media project is made up of project objects and the native representation describes each project object's context within the media project. The media tagger receives an exportable media object, encoded according to an output format, which can include logical contributions from the project object(s). The media tagger tags the exportable media object and stores the exportable media object in a media catalogue. The media tagger acknowledges the selection of a desired output format to create a formatted media project based on the native representation of the media project. Upon validating that the exportable media object in the media catalogue can be used to build the formatted media project, the media tagger exports the exportable media object from the media catalogue.

Other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides an interface with distinct interaction models as explained herein that when performed (e.g. when executing) on the processor, operates as explained herein within the computerized device to perform all of the method embodiments and operations explained herein as embodiments of the invention. Thus, any computerized device that performs or is programmed to perform the processing explained herein is an embodiment of the invention.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Adobe Systems, Incorporated of San Jose, Calif.

Note that each of the different features, techniques, configurations, etc. discussed in this disclosure can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Methods and apparatus provide for a media tagger that obtains a media project defined according to a native representation. The media project is made up of project objects and the native representation describes each project object's context within the media project. A project object's context can include that project object's role and placement within the media project—as well as any dependencies and relationships that project object has with other project objects in the media project. It is understood that an exportable media object can be interpreted as a piece of rendered media that is suitable to represent multiple project objects (or take on the role or context of a project object(s)) within a single formatted media project.

The media tagger receives the exportable media object, encoded according to an output format, which can include logical contributions from the project object(s). The media tagger tags the exportable media object and stores the exportable media object in a media catalogue. The media tagger acknowledges the selection of a desired output format to create a formatted media project based on the native representation of the media project. Upon validating that the exportable media object in the media catalogue can be used to build the formatted media project, the media tagger exports the exportable media object from the media catalogue. Thus, the native representation provides for a single model of the media project which can be easily maintained, stored and edited. However, media needed that is needed for export is available for reuse when the media project is to be encoded according to different formats and in different versions.

Figure 1:
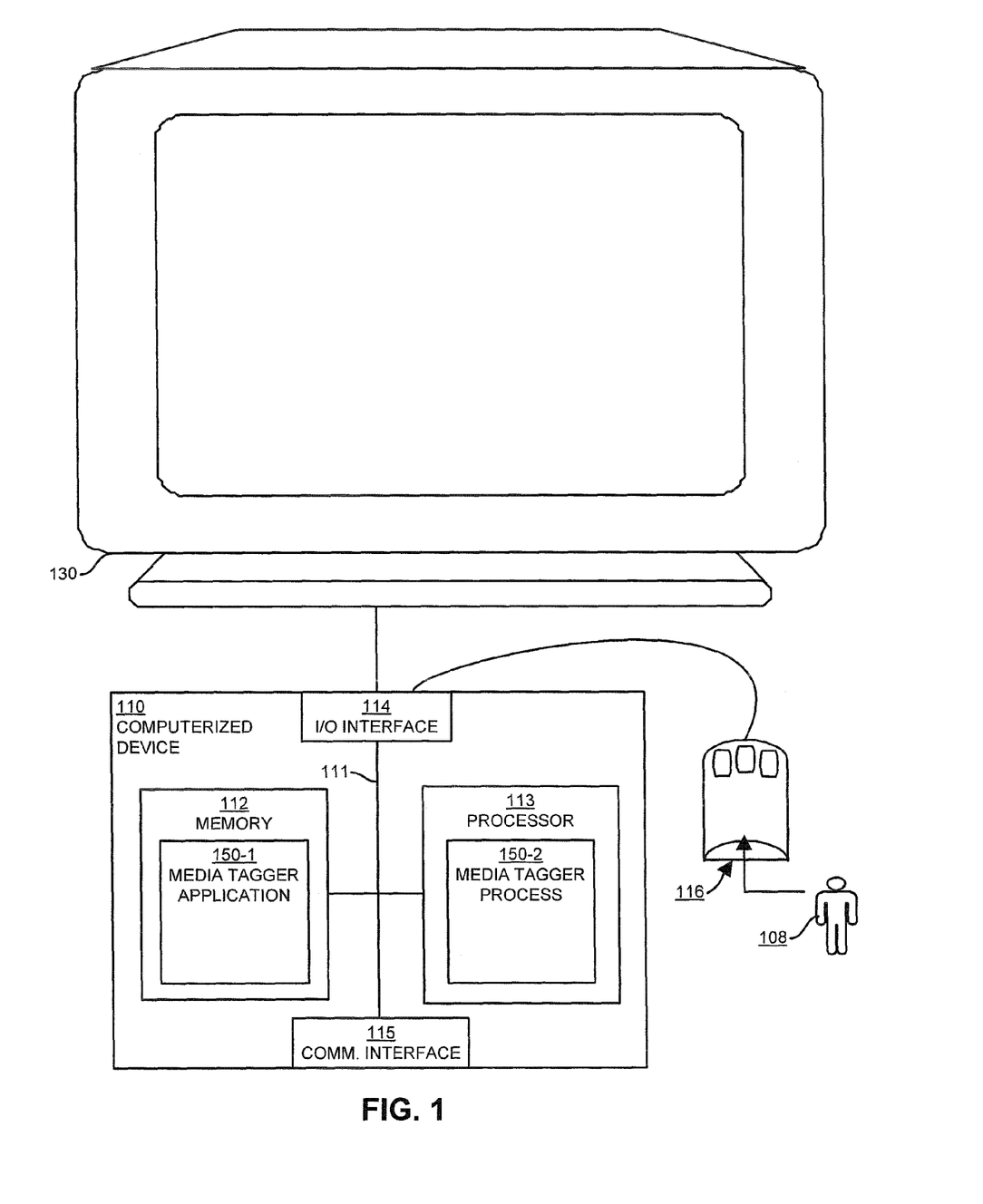
FIG. 1 is a block diagram of a computer system configured with a media tagger according to embodiments herein.

Turning now to FIG. 1, a block diagram illustrates an example of architecture for a computer system 110 that executes, runs, interprets, operates or otherwise performs a media tagger application 150-1 and/or media tagger process 150-2 (e.g. an executing version of the application 150-1 controlled by user 108) according to embodiments herein. The computer system 110 may be any type of computerized device such as a personal computer, a client computer system, workstation, portable computing device, console, laptop, network terminal or the like.

As shown in the present example, the computer system 110 includes an interconnection mechanism 111 such as a data bus, motherboard or other circuitry that couples a memory system 112, a processor 113, an input/output interface 114, and a display 130 presenting a graphical user interface 205 of the media tagger 150. An input device 116 (e.g., one or more user/developer controlled devices such as a keyboard, mouse, touch pad, etc.) couples to the computer system 110 and processor 113 through an input/output (I/O) interface 114. The computer system 110 can be a client system and/or a server system. Further, aspects of the media tagger application 150-1 and/or the media tagger process 150-2 can be distributed over a networked environment.

The memory system 112 can be any type of computer readable medium and, in this example, is encoded with a media tagger application 150-1 that supports generation, display, and implementation of functional operations as will be further explained herein. During operation of the computer system 110, the processor 113 accesses the memory system 112 via the interconnect 111 in order to launch, run, execute, interpret or otherwise perform the logic instructions of the media tagger application 150-1. Execution of the media tagger application 150-1 in this manner produces the media tagger process 150-2. In other words, the media tagger process 150-2 represents one or more portions or runtime instances of the media tagger application 150-1 (or the entire application 150-1) performing or executing within or upon the processor 113 in the computerized device 110 at runtime.

Those skilled in the art will understand that the computer system 110 may include other processes and/or software and hardware components, such as an operating system not shown in this example. A display 130 need not be coupled directly to computer system 110. For example, the media tagger application 150-1 can be executed on a remotely accessible computerized device via the network interface 115. In this instance, the graphical user interface 104 may be displayed locally to a user 108 of the remote computer, and execution of the processing herein may be client-server based.

During operation of the computer system 110, the processor 113 accesses the memory system 112 via the interconnect 111 in launch, run, execute, interpret or otherwise perform the logic instructions of the media tagger application 150-1. Execution of the media tagger application 150-1 in this manner produces processing functionality in a media tagger process 150-2. In other words, the media tagger process 150-2 represents one or more portions or runtime instances of the media tagger application 150-1 (or the entire targeted advertisement application 150-1) performing or executing within or upon the processor 113 in the computerized device 110 at runtime.

Again, the media tagger 150 tracks and invalidates media (i.e. exportable media objects) used to build a media project according to multiple output formats (e.g. DVD, Blu-Ray, Flash) without adding complexity to storage of the media project in its native representation. The media tagger 150 provides the advantages of not requiring the maintenance of specific structures in parallel with the media project in order to account for desired format peculiarities or activities to modify the project model to specifically invalidate media objects which cannot be used to build the media project in a particular format. Instead, the media project is maintained in a native representation during user and other operations while the media catalogue stores media objects. Each stored media object can be available to build the media project according to a desired output format(s) so long as that media object's rendering complies with the requirements of the desired output format. Further, each stored media object can be available for reuse but can also be invalidated from use when it does not comply with a particular requirement of a desired output format.

Figure 2:
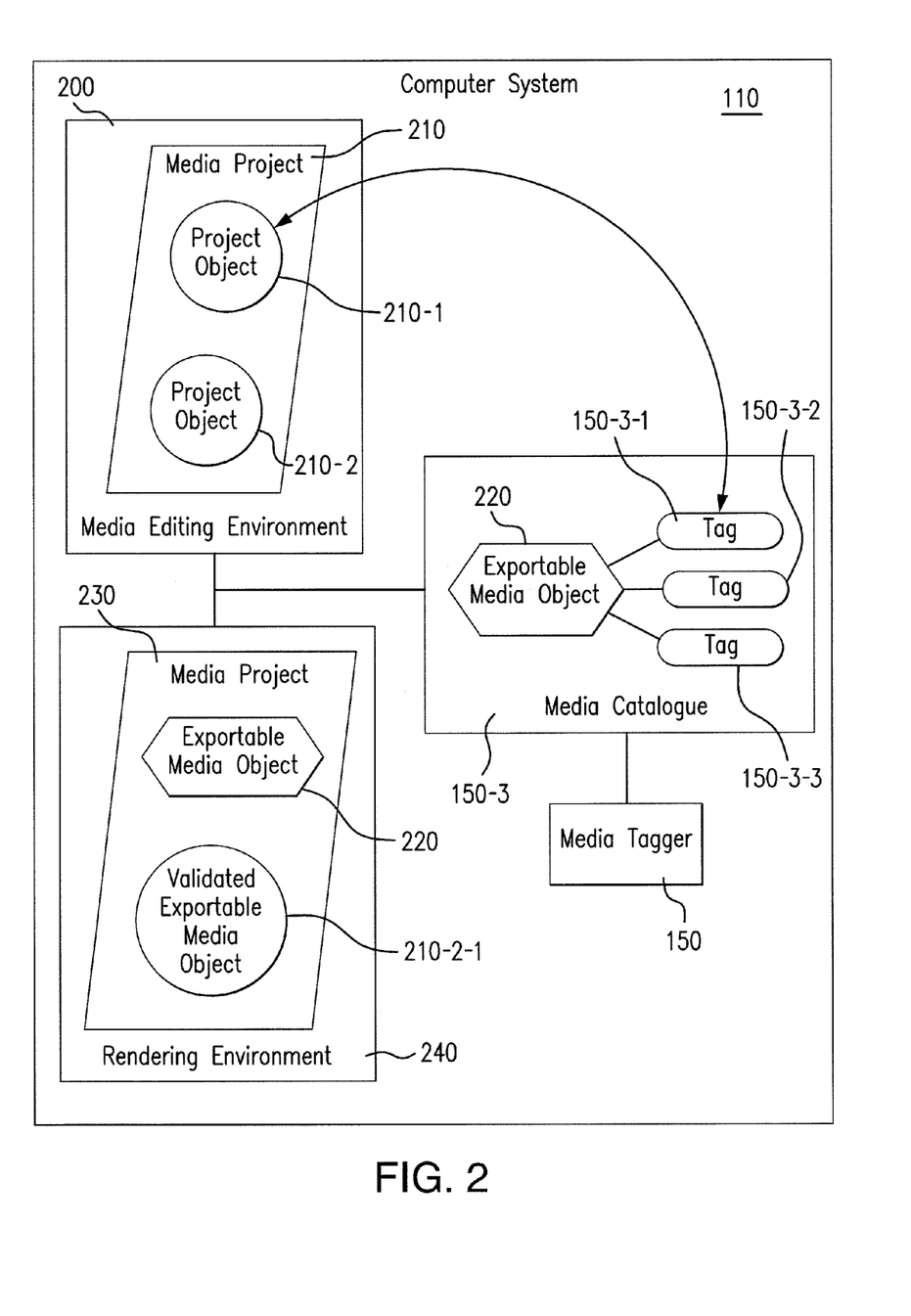
FIG. 2 is a block diagram of a computer system configured with a media tagger according to embodiments herein.

FIG. 2 is a block diagram of a computer system configured with a media tagger 150 according to embodiments herein. As illustrated in FIG. 2, a media project 210 is provided in a native representation in a media editing environment 200. The media project can contain any number of project objects 210-1, 210-2. A media catalogue 150-3 of the media tagger 150 can receive an exportable media object 220 that can be validated in order to be interpreted as a representation of various project objects 210-1, 210-2 when building the media project 230 in a desired output format. A rendering environment 240 is further included for building the formatted media project 230 with validated exportable media objects 220, 210-2-1.

For example, in one embodiment of the media tagger 150, the media project—as defined in its native representation—can contain project objects that are timeline references for tracks and clips of media. If the media project was to be encoded into a Flash format, the underlying structure of the native representation is not entirely compatible since Flash export would require the generation of media in terms of chapters instead of tracks and clips. Hence, having chapter markers to associate with the exported media is a preferable structure for the Flash version of the media project. Upon the creation of chapter objects for the native representation, an exportable media object(s) can be maintained in the media catalogue, that is interpreted to be suitable to represent the chapter object and used to build the Flash media project. The media tagger 150 allows for moving, rearranging, and deleting such chapter markers without taking any specific action to invalidate media in catalogue. After any sequence of operations on the markers and other timeline objects, the exportable media objects(s) will remain valid, or be effectively invalidated as Flash export media based on the aggregate state of the project objects representing a section of the timeline beginning at the chapter marker. Thus, the media tagger 150 described herein provides for a reliable effective invalidation of exportable media while allowing a valid state of the exportable media to be recognized in a maximal number is cases.

With regard to flowcharts 300, 500, 600, 700, 800, and 900 illustrating embodiments of the media tagger 150, the rectangular elements of FIGS. 3,5-9 are herein denoted "processing blocks" and represent computer software instructions or groups of instructions upon a computer readable medium. Alternatively, the processing blocks represent steps performed by functionally equivalent circuits such as a digital signal processor circuit or an application specific integrated circuit (ASIC). The flowcharts do not depict the syntax of any particular programming language. Rather, the flowcharts illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 3:
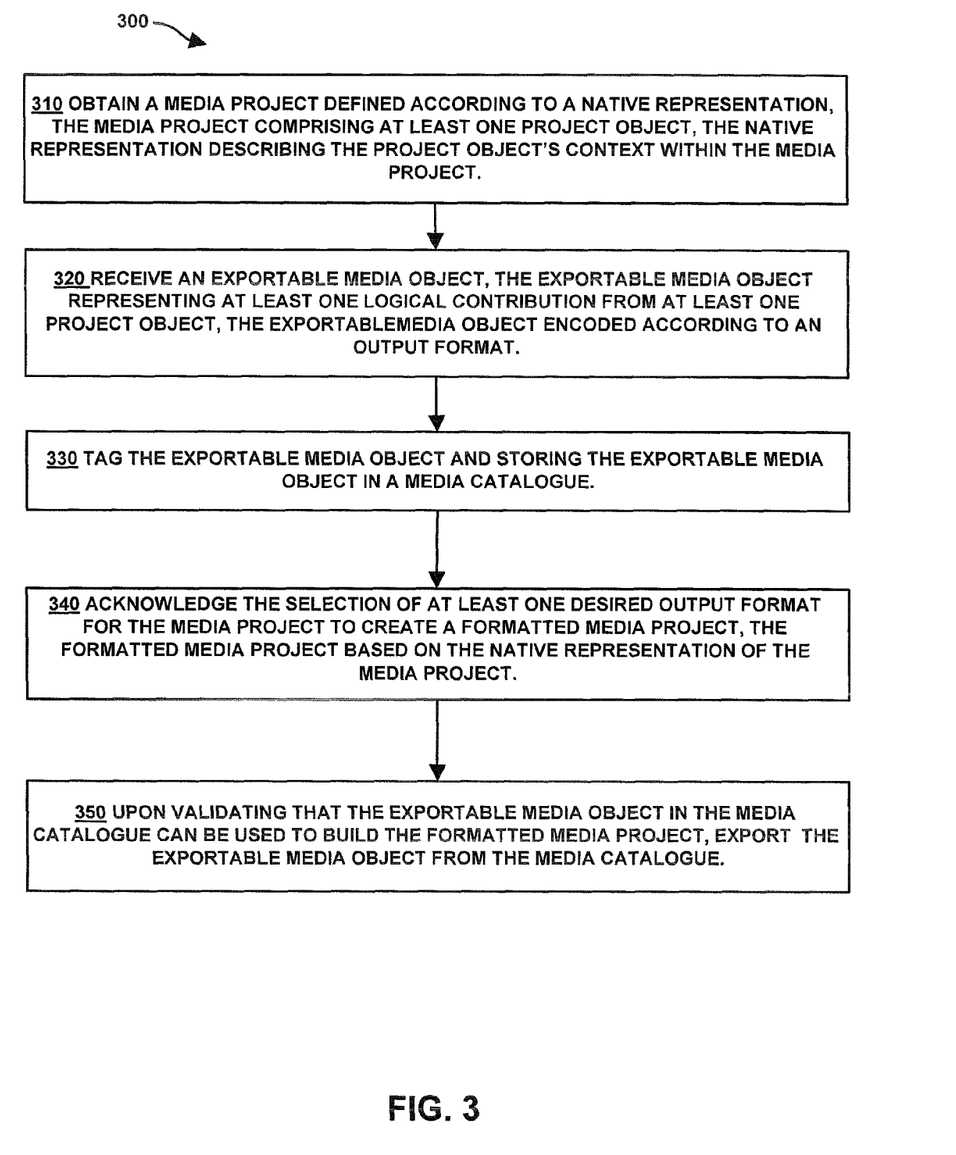
FIG. 3 is a flowchart of processing steps performed by a media tagger to tag and validate media objects in a media catalogue according to embodiments herein.

FIG. 3 is a flowchart 300 of processing steps performed by a media tagger 150 to tag and validate media objects in a media catalogue according to embodiments herein. At step 310, the media tagger 150 obtains a media project 210 defined according to a native representation. The media project 210 can include multiple project objects 210-1, 210-2. The native representation further describes each project object's context within the media project 210. At step 320, the media tagger 150 receives an exportable media object 220, encoded according to an output format, which represents a logical contribution(s) from at least one project object 210-1, 210-2. At step 330, the media tagger 150 tags the exportable media object 220 and stores the exportable media object 220 in a media catalogue 150-3.

At step 340, the media tagger 150 acknowledges the selection a desired output format for the media project 210 to create a formatted media project 230, which is based on the native representation of the media project 210. At step 350, upon validating that the exportable media object 220 in the media catalogue can be used to build the formatted media project 230, the media tagger 150 exports the exportable media object 220 from the media catalogue 150-3.

As herein discussed, validation means recognizing that a previously generated (i.e. rendered, transcoded) piece of media, such as an exportable media object, no longer corresponds to the current state of a project object(s) which it could represent in a formatted media project. For example, an exportable media object that is interpreted to be a suitable representation of the project object that represents a track of audio in a timeline project object is invalidated when the user changes an aspect within the media project (such as trimming another audio clip on the timeline), outside the media project (such as replacing the media underlying the audio clip), or modifying a related setting (such as altering transcode settings for rendering the project object).

It is also understood that when an exportable media object is said to have a logical contribution(s) from one or more project objects in the media project, the exportable media object can represent at least some piece of at least one project object. However, such representation need not be a direct representation. Instead it can be a partial or logical representation. For example, for an audio clip project object referencing a piece of a longer audio asset project object, the media catalogue can contain an exportable media object which is the rendered representation of the audio track containing that clip. Thus, that exportable media is a direct representation of that track encoded according to the export format of the exportable media object, and it contains a representation of the audio clip object, which in turn is a representation of part of the underlying asset. Hence, the particular exportable media object is logically related to those other objects (e.g. the underlying asset).

Figure 4:
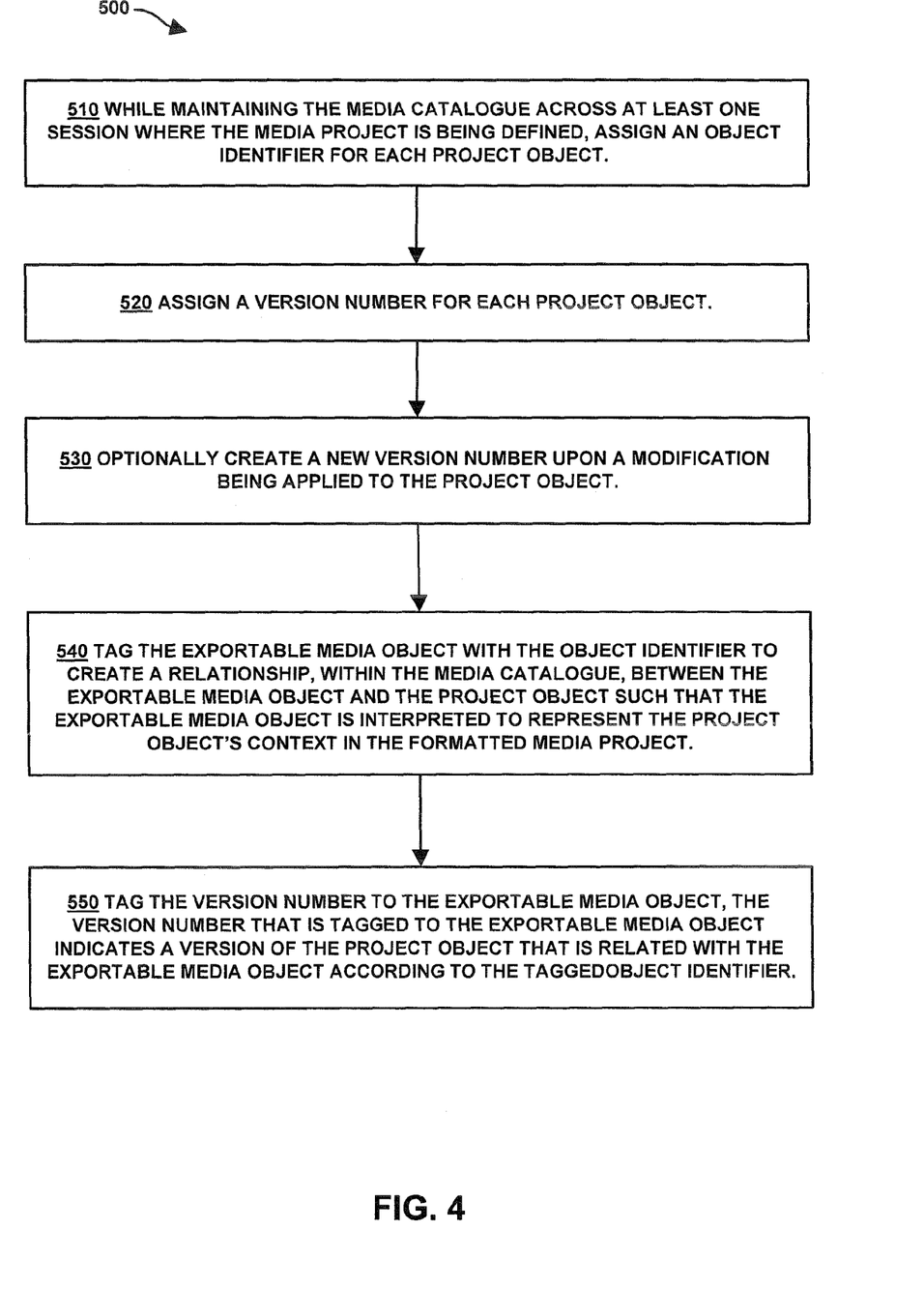
FIG. 4 is a flowchart of processing steps performed by a media tagger to tag an exportable media object with an object identifier and a version number according to embodiments herein.

FIG. 4 is a flowchart 500 of processing steps performed by a media tagger 150 to tag an exportable media object with an object identifier and a version number according to embodiments herein. At step 510, while maintaining the media catalogue 150-3 across one or more sessions where the media project 210 is being defined, the media tagger 150 assigns an object identifier for each project object 210-1. At step 520, the media tagger 150 assigns a version number for each project object 210-1. At step 530, the media tagger 150 optionally creates a new version number upon a modification being applied to the project object 210-1.

At step 540, the media tagger 150 tags 150-3-1 the exportable media object 220 with the object identifier to create a relationship, within the media catalogue 150-3, between the exportable media object 220 and the project object 210-1 such that the exportable media object 220 can be interpreted to represent the project object's 210-1 context in the formatted media project 230.

At step 550, the media tagger 150 tags 150-3-1 the version number to the exportable media object 220, the version number that is tagged 150-3-1 to the exportable media object 220 indicates a version of the project object 210-1 that is related with the exportable media object 220 according to the tagged object identifier 150-3-1.

Thus, in the media tagger's 150 first tier of tagging, every project object 210-1, 210-2 that is included in the media project 210 has an object identifier ("object I.D.") and an effective version number in a tag. Exportable media objects 220 can be placed in a single common media catalogue 150-3 and tagged (i.e. assigned, associated, appended) 150-3-1 with the object ID and version number. Such tagging 150-3-1 creates an association, within the media catalogue 150-3, between the exportable media object 220 and a project object(s) 210-1.

Further, as the project object 210-1 is changed, the media tagger 150 can update internal version numbers for each project object 210-1, 210-2 that is affected by the change. Hence, an exportable media object 220 stored in the media catalogue 150-3 will not be exported to build the "formatted" media project 230 unless it corresponds to a current version number—thereby indicating that the exportable media object 220 embodies the changes to the project object 210-1 and optionally other project objects 210-2 that project object 210-1 is dependent upon or associated with as the formatted media project 230 is built.

Figure 5:
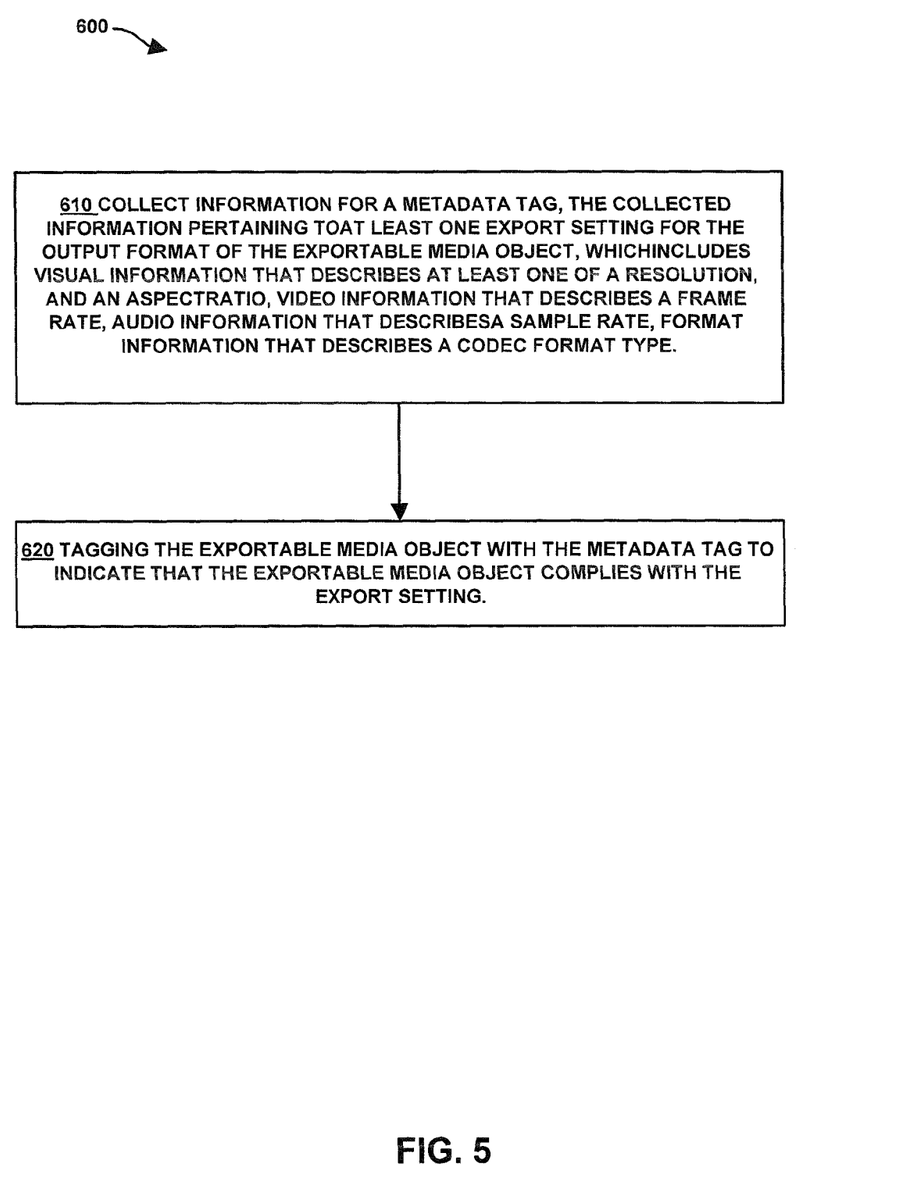
FIG. 5 is a flowchart of processing steps performed by a media tagger to tag an exportable media object with a metadata tag according to embodiments herein.

FIG. 5 is a flowchart 600 of processing steps performed by a media tagger 150 to tag an exportable media object with a metadata tag according to embodiments herein. At step 610, the media tagger 150 collects information for a metadata tag 150-3-2, the collected information pertaining to at least one export setting for the output format of the exportable media object, such as visual information that describes resolution and/or an aspect ratio, video information that describes a frame rate, audio information that describes a sample rate, and format information that describes a codec format type. At step 620, the media tagger 150 tags the exportable media object 220 with the metadata tag 150-3-2 to indicate that the exportable media object 220 complies with the export setting.

There can be many kinds of media in the media catalogue 150-3 that are associated with the same object ID at the same version number. The export module, within the media tagger 150, for a particular format knows which exportable media object 220 is encoded in a format that is compatible and desired given the particular export settings (and naturally what project object 210-1 associated with the particular exportable media object 220). Sufficient media metadata (e.g. resolution, frame rate, codec type, etc.) is stored in the metadata tag 150-3-2 for each exportable media object 220 in the media catalogue 150-3. The metadata represents the media tagger's 150 second tier of tagging and provides another kind of invalidation support in that only media that matches an export module's current requirements for media format will be exported from the media catalog 150-3. Queries can be processed against the tags 150-3-1, 150-3-2, 150-3-3 of the exportable media objects 220 so that only media appropriate for the current export settings will be identified (i.e. validated). All previous versions having a different format (even if the media object 220 is up to date at the current version level) will be effectively invalid because they will not match the parameters of the current query.

Figure 6:
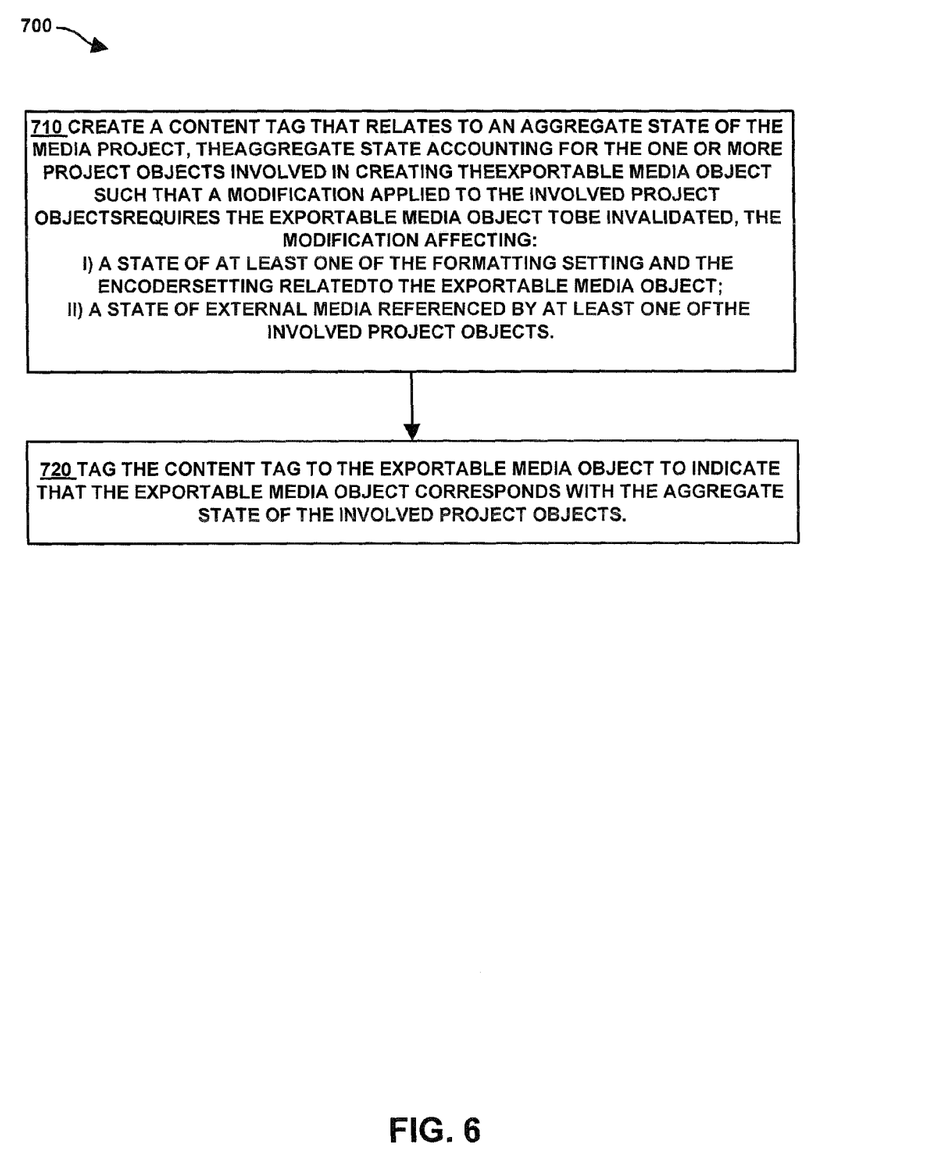
FIG. 6 is a flowchart of processing steps performed by a media tagger to tag an exportable media object with a content tag according to embodiments herein.

FIG. 6 is a flowchart 700 of processing steps performed by a media tagger 150 to tag an exportable media object with a content tag according to embodiments herein. At step 710, the media tagger 150 creates a content tag 150-3-3 that relates to an aggregate state of the media project 210. The aggregate state accounts for the project objects 210-1, 210-2 involved in creating the exportable media object 220 such that a modification applied to the involved project objects 210-1, 210-2 requires the exportable media object 220 to be invalidated. The modification can affect, for example: a state the formatting setting or an encoder setting related to the exportable media object 220, and/or the state of external media referenced by at least one of the involved project objects 210-2. At step 720, the media tagger 150 tags the content tag 150-3-3 to the exportable media object 220 to indicate that the exportable media object 220 corresponds with the aggregate state of the involved project objects 210-1, 210-2.

The media project's 230 structure, once encoded in a desired output format, can differ from the structure of the native representation 210. However, a particular piece of exportable media 220 that can be interpreted to represent a project object(s) 210-1 in the formatted media project 230 must be able to sustain the dependencies and relationships that project object 210-1 has with other project objects 210-2, as they are represented in the formatted media project 230. The media tagger 150 relies on a third tier of tagging for a proper evaluation of the state of the media project 210 (in the native representation) and its project objects 210-1 and/or 210-2. A content tag 150-3-3 is created that represents the aggregate state of all the pertinent project objects 210-1, 210-2 and settings required to create the exportable media object 220. The content tag 150-3-3 provides invalidation for such cases. For example, if there is any change in any project object or setting involved in a particular piece of the exportable media object 220, the change will be represented in the content tag 150-3-3 when the media catalogue 150-3 is queried. The exportable media object 220 is thereby effectively invalidated.

Figure 7:
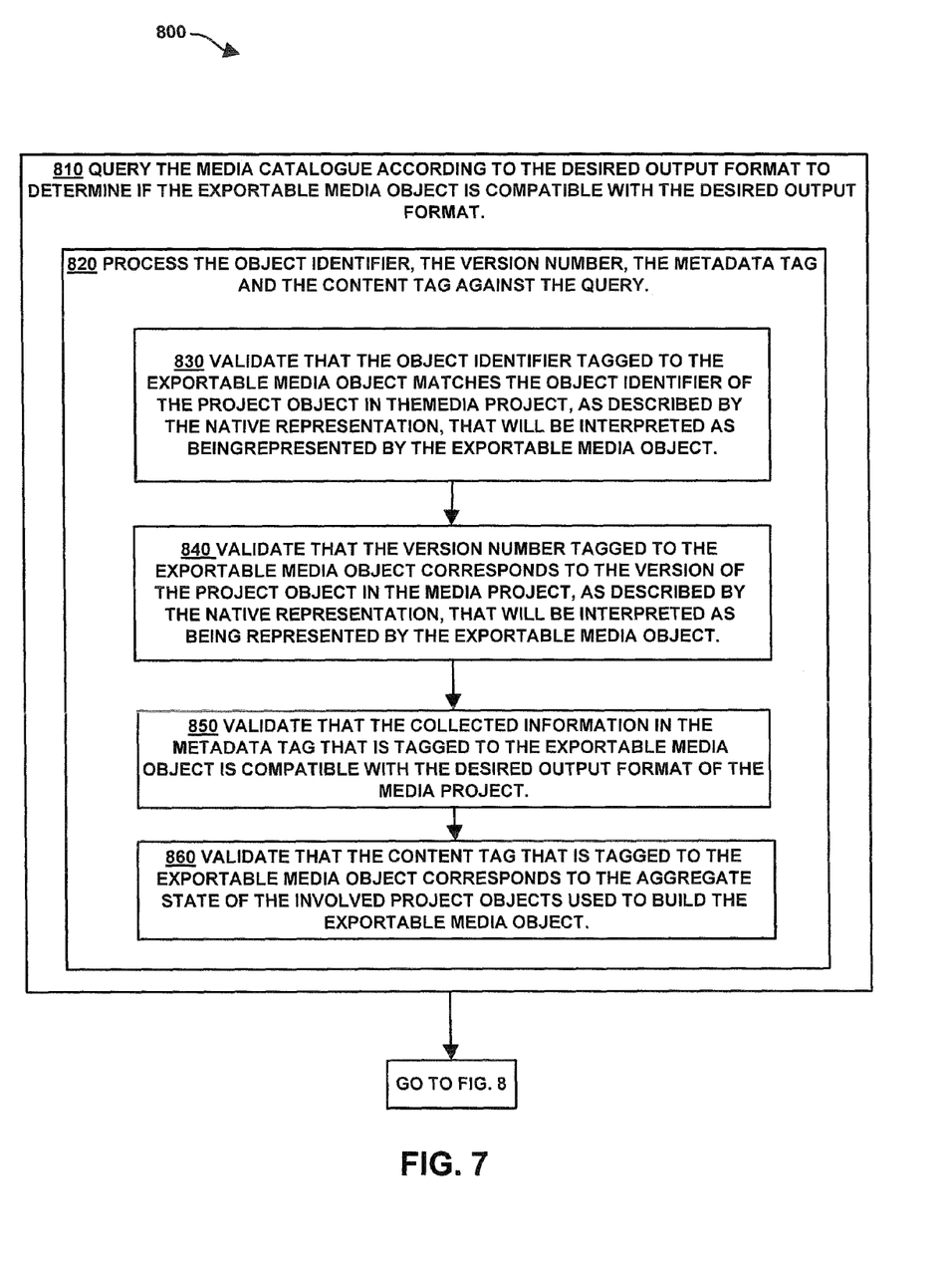
FIG. 7 is a flowchart of processing steps performed by a media tagger to query the tags of an exportable media object in order to validate whether the exportable media object can be used to build a media project in a particular output format according to embodiments herein.
Figure 8:
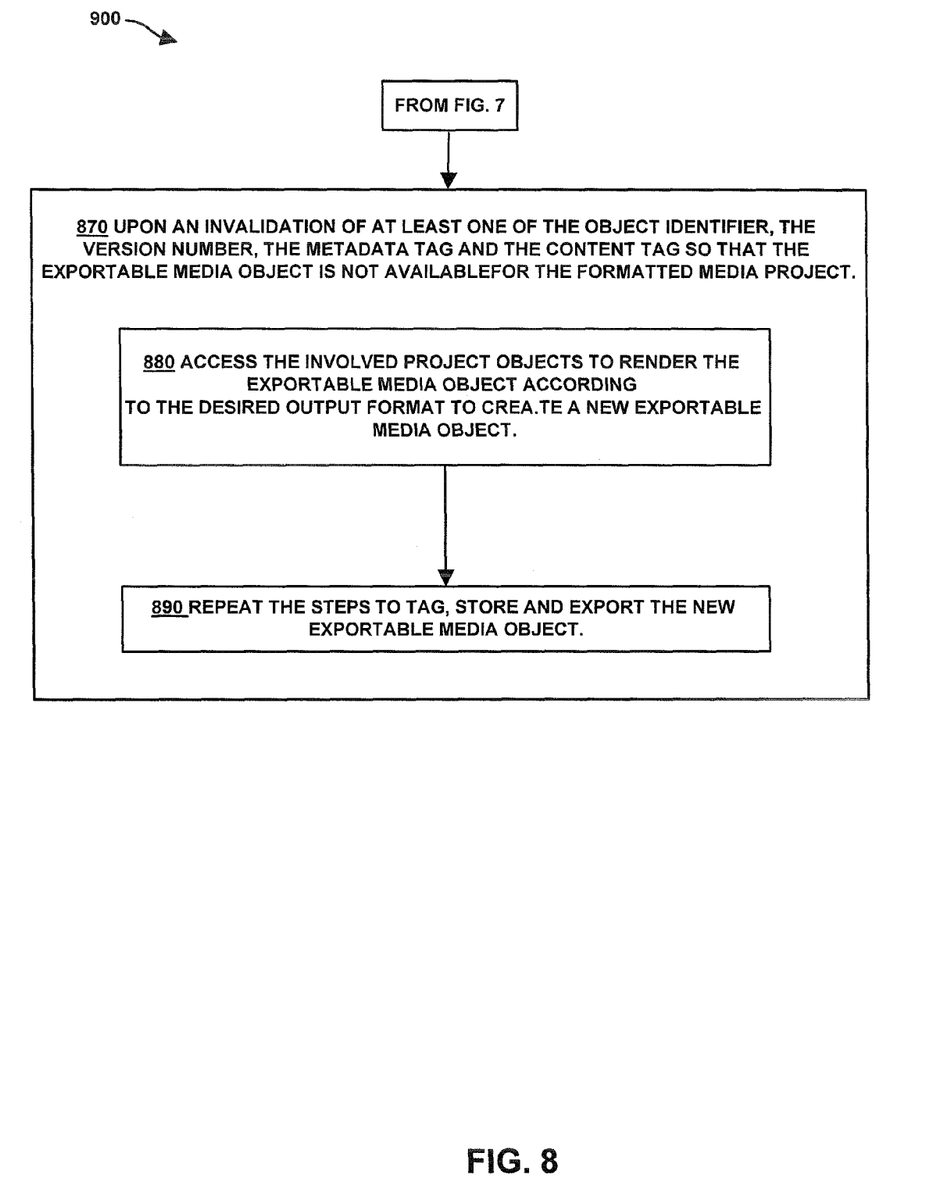
FIG. 8 is a flowchart of processing steps performed by a media tagger to query the tags of an exportable media object in order to validate whether the exportable media object can be used to build a media project in a particular output format according to embodiments herein.

FIGS. 7-8 are flowcharts 800, 900 of processing steps performed by a media tagger 150 to query the tags of an exportable media object in order to validate whether the exportable media object can be used to build a media project in a particular output format according to embodiments herein.

At steps 810-820, the media tagger 150 queries the media catalogue 150-3 according to the desired output format to determine if the exportable media object 220 is compatible with the desired output format of the formatted media project 230. The queries can be processed against the tags 150-3-1, 150-3-2, 150-3-3 that are tagged to each exportable media object 220. Hence, the queries will evaluate tag information related to the object identifier, the version number, the metadata tag and the content tag.

At step 830, the media tagger 150 validates that the object identifier tagged to the exportable media object 220 matches the object identifier of the project object(s) 210-1 in the media project 210, as described by the native representation, that will be interpreted as being represented by the exportable media object 220. Thus, the media tagger 150 is determining whether there is a relationship, within the media catalogue 150-3, between the exportable media object 220 and the project object(s) 210-1, as indicated by the object identifier 150-3-1. If the tagged 150-3-1 object identifier on the exportable media object 220 does not match to any object identifiers of any project objects 210-1, 210-2, then the media tagger 150 knows that the exportable media object 220 must be effectively invalidated because it cannot be interpreted as any project object 210-1 (or any part of a project object) for building the formatted media project 230.

At step 840, the media tagger 150 validates that the version number tagged 150-3-1 to the exportable media object 220 corresponds to the version of the project object(s) 210-1 in the media project 210, as described by the native representation, that will be interpreted as being represented by the exportable media object 220. Thus, if the tagged (i.e. assigned, appended, associated) 150-3-1 version number on the exportable media object 220 does not match to the current version number of the associated project object 210-1, then the media tagger 150 knows that the exportable media object 220 must be invalidated because it does not embody the most current version of the associated project object 210-1 for building the formatted media project 230.

At step 850, the media tagger 150 validates that the collected information in the metadata tag 150-3-2 that is tagged to the exportable media object 220 is compatible with the desired output format of the media project 230. Thus, the exportable media object 220 will be invalidated if the media tagger 150 determines that aspects of the exportable media object's 220 encoded format does not match with the format requirements for the formatted media project 230.

At step 860, the media tagger 150 validates that the content tag 150-3-3 that is tagged to the exportable media object 220 corresponds to the aggregate state of the involved project objects 210-1 and/or 210-2 used to build the exportable media object 220. Thus, if the exportable media object 220 can be interpreted to be a suitable representation of a project object 210-1 for building the formatted media project 230, the media tagger 150 seeks to determine whether changes to other project objects 210-2 will not disturb the exportable media object's 220 viability for inclusion in the formatted media project 230. For example, if a project object 210-1 to be represented by the exportable media object 220 has a particular dependency with another project object 210-2, the exportable media object 220 can be invalidated if the "dependant" project object 210-2 has been modified.

At steps 870-880, upon an invalidation of exportable media object 220, the media tagger 150 accesses the involved project objects 210-1 and/or 210-2 to render the exportable media object 220 according to the desired output format to create a new exportable media object. At step 890, the media tagger 150 repeats the steps of tagging, storing and exporting on the new exportable media object.

Note again that techniques herein are well suited for a media tagger 150 that allows for a media tagger 150 that tracks and invalidates media (i.e. exportable media objects) used to build a media project according to multiple output formats (e.g. DVD, Blu-ray, Flash) without adding complexity to storage of the media project in its native representation. The media tagger application 150-1 may be stored on a computer readable medium (such as a floppy disk), hard disk, electronic, magnetic, optical, or other computer readable medium. It is understood that embodiments and techniques discussed herein are well suited for other applications as well.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method comprising:
   obtaining a media project defined according to a native representation, the media project comprising at least one project object, the native representation describing the project object's context within the media project;
   receiving an exportable media object, the exportable media object representing at least one logical contribution from at least one project object, the exportable media object encoded according to an output format;
   tagging the exportable media object with at least one metadata tag based on a version number and an object identifier, the version number and object identifier associated with at least one of the project objects;
   storing the exportable media object in a media catalogue;
   acknowledging the selection of at least one desired output format for the media project to create a formatted media project, the formatted media project based on the native representation of the media project;
   determining whether the exportable media object is valid based at least in part on the metadata tag,
   if the exportable media object is invalid, marking the exportable media object as invalid in the media catalog; and
   otherwise, exporting the exportable media object from the media catalogue.

2. The method as in claim 1, wherein obtaining the media project includes:
   obtaining the project object as data that is a part of the media project, the media project defining a viewer-controlled browsing experience modeled via the native representation, the native representation allowing the media project to be encoded according to the desired output format in order to build the formatted media project with at least one exportable media object.

3. The method as in claim 2, wherein obtaining the project object as data that is a part of the media project includes:

obtaining at least one of:
i) a video track;
ii) an audio track;
iii) an image use;
iv) a timeline;
v) a menu;
vi) a menu item;
vii) a link to another media object;
viii) a browsing experience action;
iv) a chapter point relative to the timeline;
x) a subtitle;
xi) a position in the timeline;
xii) a format setting, the format setting defining the format of the exportable media object;
xiii) an encoder setting, the encoder setting including at least one instruction defining how to create the exportable media object in the format defined in the format setting;
xiv) a reference to external media by the project object;
xv) a project media containing at least one of audio, an image and video; or
xii) a highlight.

4. The method as in claim 1, wherein tagging the exportable media object includes:
while maintaining the media catalogue across at least one session where the media project is being defined, assigning object identifiers to the project objects;
assigning a-version numbers to each of the project objects;
optionally creating a new version number upon a modification being applied to the project object;
associating the exportable media object with the object identifier to create a relationship, within the media catalogue, between the exportable media object and the project object such that the exportable media object is interpreted to represent the project object's context in the formatted media project; and
assigning the version number to the exportable media object, the version number that is tagged to the exportable media object indicates a version of the project object that is related with the exportable media object according to the tagged object identifier.

5. The method as in claim 1, wherein tagging the exportable media object includes:
collecting information for the metadata tag, the collected information pertaining to at least one export setting for the output format of the exportable media object; and
associating the exportable media object with the metadata tag to indicate that the exportable media object complies with the export setting.

6. The method as in claim 5, wherein collecting information for the metadata tag, the collected information pertaining to at least one export setting for the output format of the exportable media object includes at least one of:
collecting visual information that describes at least one of a resolution, and an aspect ratio;
collecting video information that describes a frame rate;
collecting audio information that describes a sample rate; and
collecting format information that describes a codec format type.

7. The method as in claim 1, wherein tagging the exportable media object includes:
creating a content tag that relates to an aggregate state of the media project, the aggregate state accounting for the one or more project objects involved in creating the exportable media object such that a modification applied to the involved project objects requires the exportable media object to be invalidated, the modification affecting:
i) a state of at least one of the formatting setting and the encoder setting related to the exportable media object; and
ii) a state of external media referenced by at least one of the involved project objects; and
assigning the content tag to the exportable media object to indicate that the exportable media object corresponds with the aggregate state of the involved project objects.

8. The method as in claim 1, wherein validating that the exportable media object in the media catalogue can be included within the formatted media project includes:
querying the media catalogue according to the desired output format to determine if the exportable media object is compatible with the desired output format, which includes:
processing the object identifier, the version number, the metadata tag and a content tag against the query.

9. The method as in claim 8, wherein processing the object identifier, the version number, the metadata tag and the content tag against the query includes at least one of the following:
validating that the object identifier tagged to the exportable media object matches the object identifier of the project object in the media project, as described by the native representation, that will be interpreted as being represented by the exportable media object;
validating that the version number tagged to the exportable media object corresponds to the version of the project object in the media project, as described by the native representation, that will be interpreted as being represented by the exportable media object;
validating that the collected information in the metadata tag that is tagged to the exportable media object is compatible with the desired output format of the media project; and
validating that the content tag that is tagged to the exportable media object corresponds to the aggregate state of the involved project objects used to build the exportable media object.

10. The method as in claim 9, further comprising:
if at least one of the object identifier, the version number, and the content tag is invalid for the formatted media project:
accessing the involved project objects to render the exportable media object according to the desired output format to create a new exportable media object; and
repeating the steps of tagging, storing and exporting on the new exportable media object.

11. A computer system comprising:
a processor;
a memory unit that stores instructions associated with an application executed by the processor; and
an interconnect coupling the processor and the memory unit, enabling the computer system to execute the application and perform operations of:
obtaining a media project defined according to a native representation, the media project comprising at least one project object, the native representation describing the project object's context within the media project;
receiving an exportable media object, the exportable media object representing at least one logical contribution from at least one project object, the exportable media object encoded according to an output format;

tagging the exportable media object with at least one metadata tag based on a version number and an object identifier, the version number and object identifier associated with the project object;

storing the exportable media object in a media catalogue;

acknowledging the selection of at least one desired output format for the media project to create a formatted media project, the formatted media project based on the native representation of the media project;

determining whether the exportable media object is valid based at least in part on the metadata tag and the formatted media project, if the exportable media object is invalid, marking the exportable media object as invalid in the media catalog; and otherwise, exporting the exportable media object from the media catalogue.

12. A computer-readable medium comprising program code, the program code comprising:

program code for receiving a native-format media project having a plurality of project objects;

program code for associating one or more media objects with each of the plurality of project objects, the media objects stored within a media catalog, the media objects each having at least one metadata tag, each metadata tag based on a version number and an object identifier associated with the respective project object;

program code for validating each of the one or more media objects for its respective associated project object based on the metadata tag and, if valid, marking the respective media object as valid, otherwise marking the respective media object as invalid;

program code for, for any of the associated media objects determined to be invalid, marking the associated media object as invalid;

program code for exporting any of the media objects marked as valid;

program code for rendering each of the media objects marked as invalid; and program code for building a formatted media project using the exported media objects and the rendered media objects.

13. The computer-readable medium of claim 12, further comprising program code for receiving a modification of one of the plurality of project objects; and program code for validating any of the media objects associated with the modified project object based on the modification.

14. The computer-readable medium of claim 12, further comprising:

program code for storing the rendered media objects in the media catalog as new exportable media objects;

program code for generating a metadata tag for each new exportable media object each generated metadata tag based on the version number and the object identifier associated with the project object associated with the respective new exportable media object; and program code for marking each new exportable media object as valid.

15. The computer-readable medium of claim 12, wherein the at least one metadata tag further comprises format information indicating a compatibility with at least one output format.

16. The computer-readable medium of claim 15, wherein validating each of the one or more media objects comprises comparing the format information of the metadata tag for each media object and an output format of the respective associated project object.

17. The computer-readable medium of claim 15, wherein the format information comprises at least one of a resolution, an aspect ratio, a frame rate, a sample rate, or a codec format.

18. The computer-readable medium of claim 12, further comprising:

program code for receiving a selection of a desired output format for the formatted media project; and wherein the program code for validating each of the one or more media objects is configured to validate each of the one or more media objects based on the desired output format.

19. The computer-readable medium of claim 12, wherein the program code for validating each of the one or more media objects is configured to only validate each of the one or more media objects with respect to formatted media project.

* * * * *

UNITED STATES PATENT AND TRADEMARK OFFICE
CERTIFICATE OF CORRECTION

| | | |
|---|---|---|
| PATENT NO. | : 8,140,953 B1 | |
| APPLICATION NO. | : 11/924954 | |
| DATED | : March 20, 2012 | |
| INVENTOR(S) | : Dale Matthew Weaver | |

It is certified that error appears in the above-identified patent and that said Letters Patent is hereby corrected as shown below:

Column 13, Claim 4, Line 29:

Delete the word "a-"

Signed and Sealed this
Twenty-fourth Day of July, 2012

David J. Kappos
*Director of the United States Patent and Trademark Office*